(12) United States Patent
Lv

(10) Patent No.: US 10,585,336 B2
(45) Date of Patent: Mar. 10, 2020

(54) CENTROID ADJUSTMENT MECHANISM OF PAN-TILT-ZOOM CAMERA, PAN-TILT-ZOOM, AND AERIAL VEHICLE

(71) Applicant: AUTEL ROBOTICS CO., LTD., Shenzhen, Guangdong (CN)

(72) Inventor: Guogang Lv, Guangdong (CN)

(73) Assignee: AUTEL ROBOTICS CO., LTD, Shenzhen, Guangdong (CN)

(*) Notice: Subject to any disclaimer, the term of this patent is extended or adjusted under 35 U.S.C. 154(b) by 0 days.

(21) Appl. No.: 16/003,569

(22) Filed: Jun. 8, 2018

(65) Prior Publication Data

US 2018/0292735 A1    Oct. 11, 2018

Related U.S. Application Data

(63) Continuation of application No. PCT/CN2016/093591, filed on Aug. 5, 2016.

(30) Foreign Application Priority Data

Feb. 25, 2016   (CN) .................... 2016 2 0142386 U

(51) Int. Cl.
*G03B 17/56*     (2006.01)
*B64D 47/08*     (2006.01)
(Continued)

(52) U.S. Cl.
CPC .......... *G03B 17/561* (2013.01); *B64D 47/08* (2013.01); *F16M 11/043* (2013.01);
(Continued)

(58) Field of Classification Search
CPC ............................ G03B 17/561; B64D 47/08
See application file for complete search history.

(56) References Cited

U.S. PATENT DOCUMENTS 4,721,005 A    1/1988  Yoshiji et al.
5,825,536 A   10/1998  Yasunaga et al.
(Continued)

FOREIGN PATENT DOCUMENTS

CN     201413446 Y    2/2010
CN     201974620 U    9/2011
(Continued)

OTHER PUBLICATIONS

Extended European Search Report dated Jul. 19, 2018; Appln. No. 16891180.8.
(Continued)

*Primary Examiner* — Clayton E. LaBalle
*Assistant Examiner* — Dennis Hancock
(74) *Attorney, Agent, or Firm* — Ladas & Parry, LLP

(57) ABSTRACT

The present application relates to the technical field of photographing devices, and provides a centroid adjustment mechanism of a pan-tilt-zoom camera, a pan-tilt-zoom, and an aerial vehicle. The centroid adjustment mechanism includes: a camera base provided on a pan-tilt-zoom, and a slide platform located below the camera base, and further including: an X axis direction centroid adjustment mechanism, a Y axis direction centroid adjustment mechanism, and a Z axis direction centroid adjustment mechanism that adjust a camera centroid in three directions in a working manner of meshing a gear with a rack.

10 Claims, 3 Drawing Sheets

(51) Int. Cl.
*F16M 11/04* (2006.01)
*F16M 13/02* (2006.01)
*G03B 15/00* (2006.01)

(52) U.S. Cl.
CPC ........... *F16M 13/02* (2013.01); *G03B 15/006* (2013.01); *G03B 17/56* (2013.01)

(56) References Cited

U.S. PATENT DOCUMENTS

| | | | |
|---|---|---|---|
| 2014/0037278 | A1 | 2/2014 | Wang |
| 2016/0286098 | A1* | 9/2016 | Rappaport ........... H04N 5/2251 |
| 2016/0291445 | A1* | 10/2016 | Fisher, Sr. ........... G03B 15/006 |

FOREIGN PATENT DOCUMENTS

| | | |
|---|---|---|
| CN | 203770970 U | 8/2014 |
| CN | 104696690 A | 6/2015 |
| CN | 204647748 U | 9/2015 |
| CN | 205396566 U | 7/2016 |
| DE | 10208413 A1 | 9/2003 |
| WO | 2015/085499 A1 | 6/2015 |

OTHER PUBLICATIONS

International Search Report dated Nov. 15, 2016; PCT/CN2016/093591.

\* cited by examiner

CENTROID ADJUSTMENT MECHANISM OF PAN-TILT-ZOOM CAMERA, PAN-TILT-ZOOM, AND AERIAL VEHICLE

CROSS-REFERENCE

This application is a continuation application of International Application No. PCT/CN2016/093591, filed on Aug. 5, 2016, which claims priority of Chinese Patent Application No. 201620142386.4, filed on Feb. 25, 2016, which is incorporated herein by reference in its entirety.

BACKGROUND

Technical Field

The present application relates to the technical field of photographing devices, and in particular, to a centroid adjustment mechanism of a pan-tilt-zoom camera, a pan-tilt-zoom, and an aerial vehicle.

Related Art

A pan-tilt-zoom is used to install, fix, and support a photographing device. Masses and centroids of different cameras are greatly different. To enable the pan-tilt-zoom to be applicable to various different cameras, the pan-tilt-zoom needs to be provided with a mechanism that can adjust centroids of different cameras. A centroid adjustment mechanism on an existing pan-tilt-zoom has a slow adjustment speed and low precision. How to design a centroid adjustment mechanism of a pan-tilt-zoom camera to quickly and accurately adjust a camera centroid slightly is a problem that needs to be resolved in the prior art.

SUMMARY

To overcome the disadvantages in the prior art, the present application provides a centroid adjustment mechanism of a pan-tilt-zoom camera, a pan-tilt-zoom, and an aerial vehicle, to resolve the problem that a centroid adjustment mechanism of an existing pan-tilt-zoom camera has a slow adjustment speed and low precision.

To achieve the foregoing objective, the present application uses the following technical solutions:

A centroid adjustment mechanism of a pan-tilt-zoom camera is provided, including: a camera base provided on a pan-tilt-zoom, and a slide platform located below the camera base, and further including: an X axis direction centroid adjustment mechanism, a Y axis direction centroid adjustment mechanism, and a Z axis direction centroid adjustment mechanism that adjust a camera centroid in three directions in a working manner of meshing a gear with a rack.

In some embodiments, the X axis direction centroid adjustment mechanism is located at the bottom of the camera base, and includes: an X axis direction guide rod, an X axis direction gear, and an X axis direction knob, where an upper end of the X axis direction gear and the slide platform are fixedly connected, a lower end of the X axis direction gear and the X axis direction knob are fixedly connected, and the X axis direction gear meshes with a rack that is on an inner side of the X axis direction guide rod;

the Y axis direction centroid adjustment mechanism is located on a lateral side of the camera base, and includes: a Y axis direction gear and a Y axis direction knob, where the Y axis direction gear and the Y axis direction knob are fixedly connected and are sleeved inside the slide platform, and the Y axis direction gear meshes with a rack that is at the bottom of the camera base; and the Z axis direction centroid adjustment mechanism is located on two sides of the X axis direction guide rod, and includes: a Z axis direction guide rod, a Z axis direction gear, a Z axis direction knob, a support block, and a fixed block, where an upper end of the support block is connected to the slide platform, a lower end of the support block is sleeved on the X axis direction guide rod, the X axis direction guide rod is sleeved on the Z axis direction guide rod by using the fixed block, the Z axis direction gear and the Z axis direction knob are fixedly connected and are inserted to the fixed block, and the Z axis direction gear meshes with a rack that is on an inner side of the Z axis direction guide rod.

In some embodiments, a unit scale bar is engraved on a lateral side of the camera base, and a scale bar aligned with the unit scale bar of the camera base is engraved on the slide platform.

In some embodiments, unit scale bars are respectively engraved on outer sides of the X axis direction guide rod and the Z axis direction guide rod.

In some embodiments, there are at least two Z axis direction centroid adjustment mechanisms.

In another aspect, the present application provides a pan-tilt-zoom, including: a pan-tilt-zoom body and a centroid adjustment mechanism of a pan-tilt-zoom camera, where the adjustment mechanism includes a camera base provided on the pan-tilt-zoom, and a slide platform located below the camera base, and the adjustment mechanism further includes: an X axis direction centroid adjustment mechanism, a Y axis direction centroid adjustment mechanism, and a Z axis direction centroid adjustment mechanism that adjust a camera centroid in three directions in a working manner of meshing a gear with a rack.

In some embodiments, the X axis direction centroid adjustment mechanism is located at the bottom of the camera base, including: an X axis direction guide rod, an X axis direction gear, and an X axis direction knob, where an upper end of the X axis direction gear and the slide platform are fixedly connected, a lower end of the X axis direction gear and the X axis direction knob are fixedly connected, and the X axis direction gear meshes with a rack that is on an inner side of the X axis direction guide rod;

the Y axis direction centroid adjustment mechanism is located on a lateral side of the camera base, and includes: a Y axis direction gear and a Y axis direction knob, where the Y axis direction gear and the Y axis direction knob are fixedly connected and are sleeved inside the slide platform, and the Y axis direction gear meshes with a rack that is at the bottom of the camera base; and the Z axis direction centroid adjustment mechanism is located on two sides of the X axis direction guide rod, and includes: a Z axis direction guide rod, a Z axis direction gear, a Z axis direction knob, a support block, and a fixed block, where an upper end of the support block is connected to the slide platform, a lower end of the support block is sleeved on the X axis direction guide rod, the X axis direction guide rod is sleeved on the Z axis direction guide rod by using the fixed block, the Z axis direction gear and the Z axis direction knob are fixedly connected and are inserted to the fixed block, and the Z axis direction gear meshes with a rack that is on an inner side of the Z axis direction guide rod.

In some embodiments, a unit scale bar is engraved on a lateral side of the camera base, and a scale bar aligned with the unit scale bar of the camera base is engraved on the slide platform.

In some embodiments, unit scale bars are respectively engraved on outer sides of the X axis direction guide rod and the Z axis direction guide rod.

To improve the technical solutions, the present application further provides an aerial vehicle, including: an aerial vehicle body, a camera, and the pan-tilt-zoom according to the present application.

Beneficial effects of the present application are as follows: A centroid adjustment mechanism of a pan-tilt-zoom camera, a pan-tilt-zoom, and an aerial vehicle are provided. The centroid adjustment mechanism of the pan-tilt-zoom camera may respectively perform adjustment for different cameras in three directions of an X axis direction, a Y axis direction, and a Z axis direction, and perform adjustment quickly and accurately in a manner of rotating knobs in the three directions to drive a gear to mesh with a rack in the three directions. The rack and a scale are both provided on a pan-tilt-zoom guide rod and a camera base. Therefore, the pan-tilt-zoom having the centroid adjustment mechanism has a compact structure and aesthetic appeal of external appearance while quickly adjusting a camera centroid. Besides, the aerial vehicle having the pan-tilt-zoom has high aerial photographing quality, and can quickly and precisely adjust a camera centroid position required by photographing.

Figure 1:
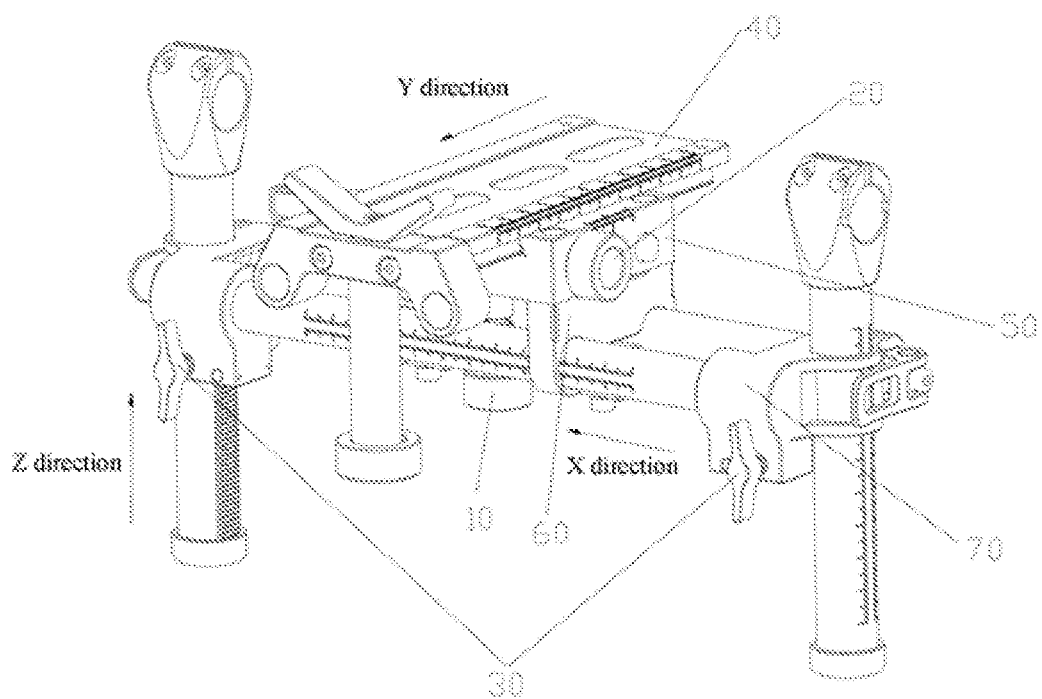
FIG. 1 is a schematic structural diagram of a centroid adjustment mechanism of a pan-tilt-zoom camera according to Embodiment 1 of the present application.

Reference numerals: 10. X axis direction centroid adjustment mechanism; 20. Y axis direction centroid adjustment mechanism; 30. Z axis direction centroid adjustment mechanism; 40. Camera base; 50. Slide platform; 60. Support block; 70. Fixed block; 101. X axis direction guide rod; 102. X axis direction gear; 103. X axis direction knob; 201. Y axis direction gear; 202. Y axis direction knob; 301. Z axis direction guide rod; 302. Z axis direction gear; and 303. Z axis direction knob.

DETAILED DESCRIPTION

To make the objectives, technical solutions, and advantages of the present application more comprehensible, the present application is described in further detail below with reference to the accompanying drawings and embodiments. It should be understood that, specific embodiments described herein are merely used for explaining the present application, but not used for limiting the present application.

Embodiment 1

Figure 2:
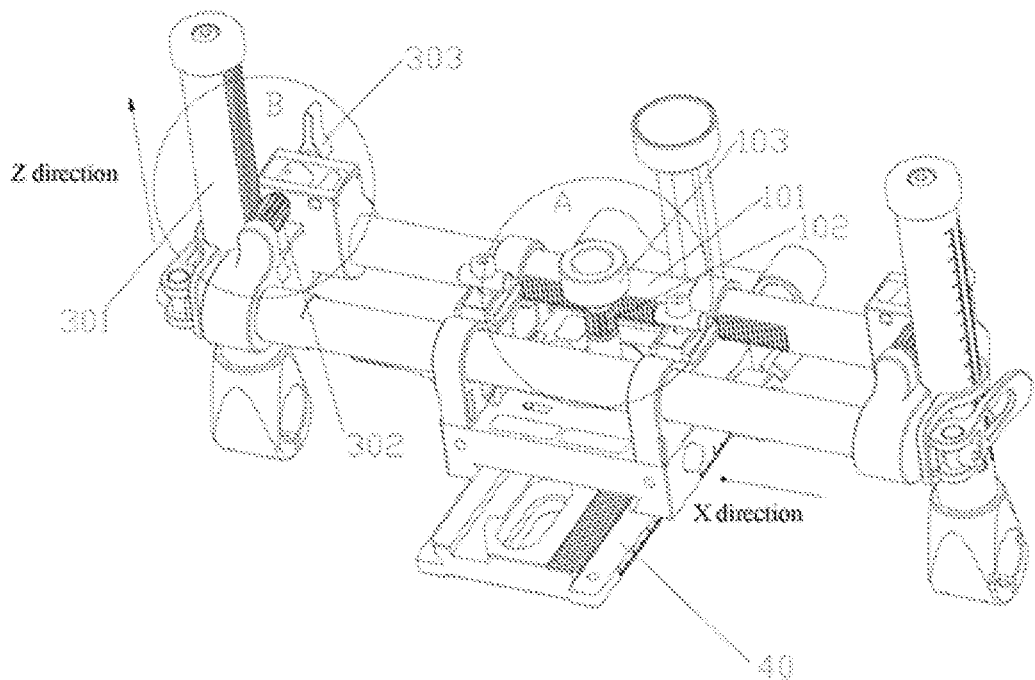
FIG. 2 is a schematic structural diagram of an X axis direction centroid adjustment mechanism (portion A) and a Z axis direction centroid adjustment mechanism (portion B) in a centroid adjustment mechanism of a pan-tilt-zoom camera according to Embodiment 1 of the present application.
Figure 3:
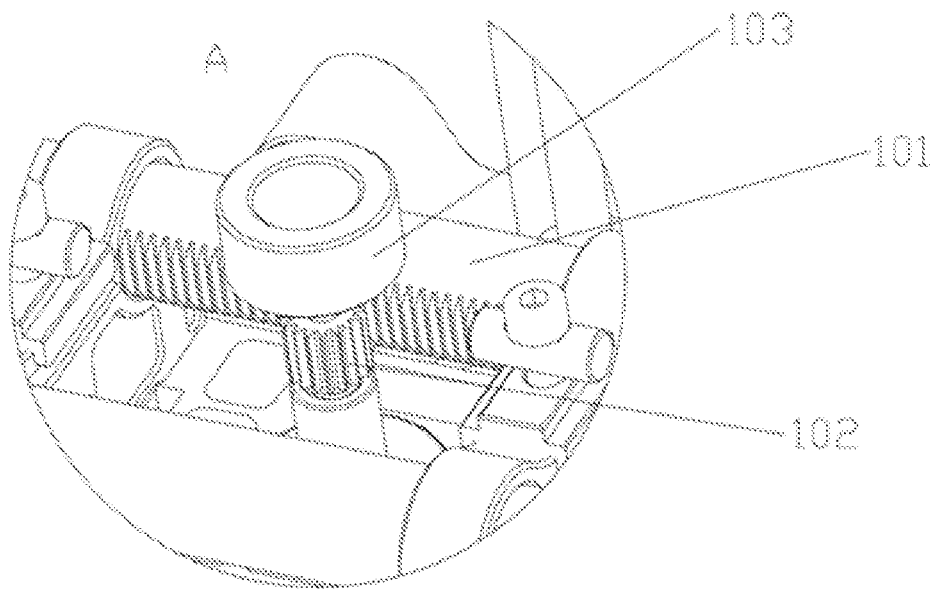
FIG. 3 is an enlarged schematic diagram of the portion A in FIG. 2.
Figure 4:
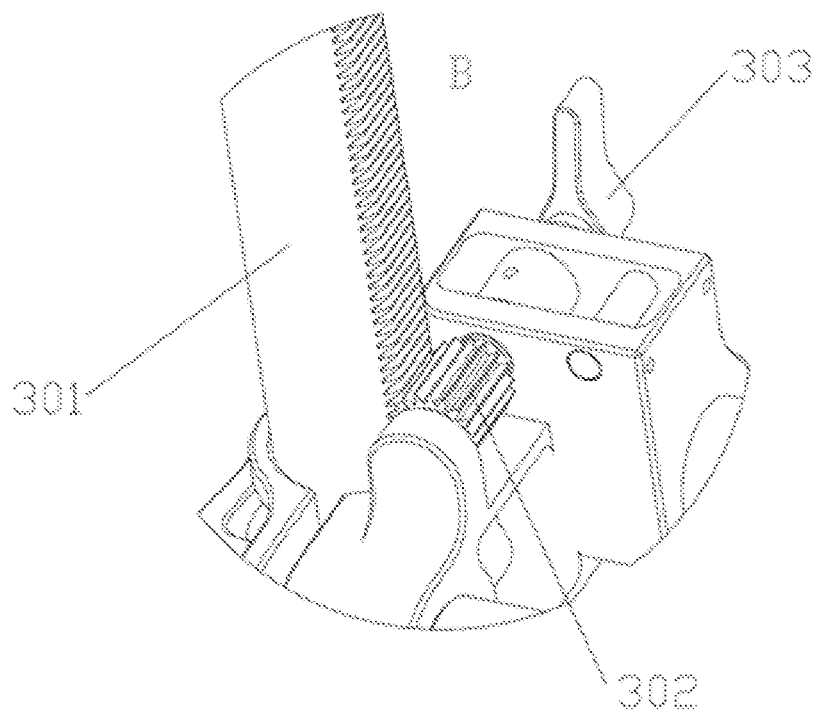
FIG. 4 is an enlarged schematic diagram of the portion B in FIG. 2.
Figure 5:
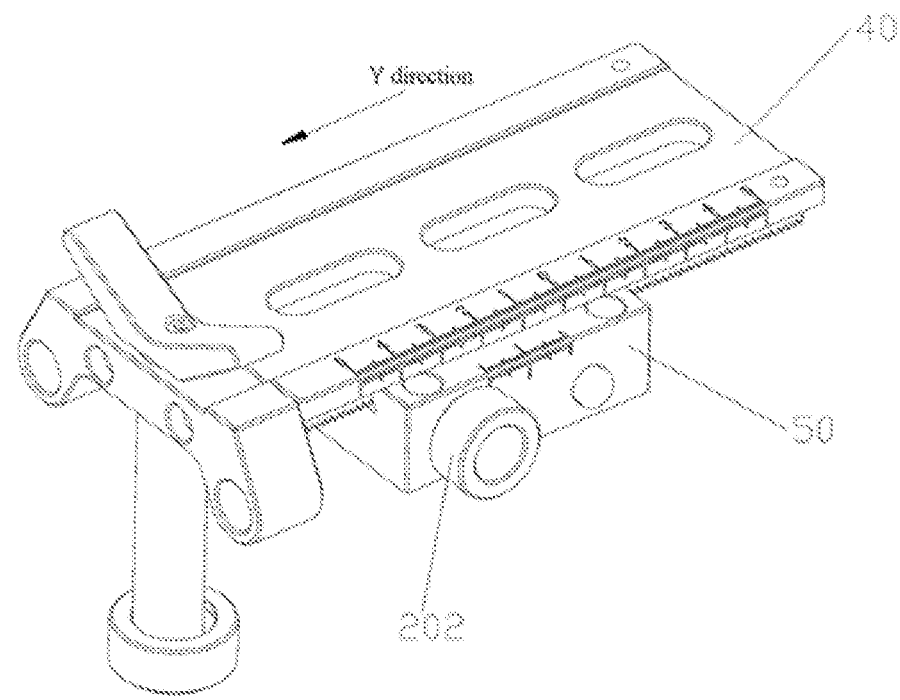
FIG. 5 is a schematic structural diagram of a Y axis direction centroid adjustment mechanism in a centroid adjustment mechanism of a pan-tilt-zoom camera according to Embodiment 1 of the present application.
Figure 6:
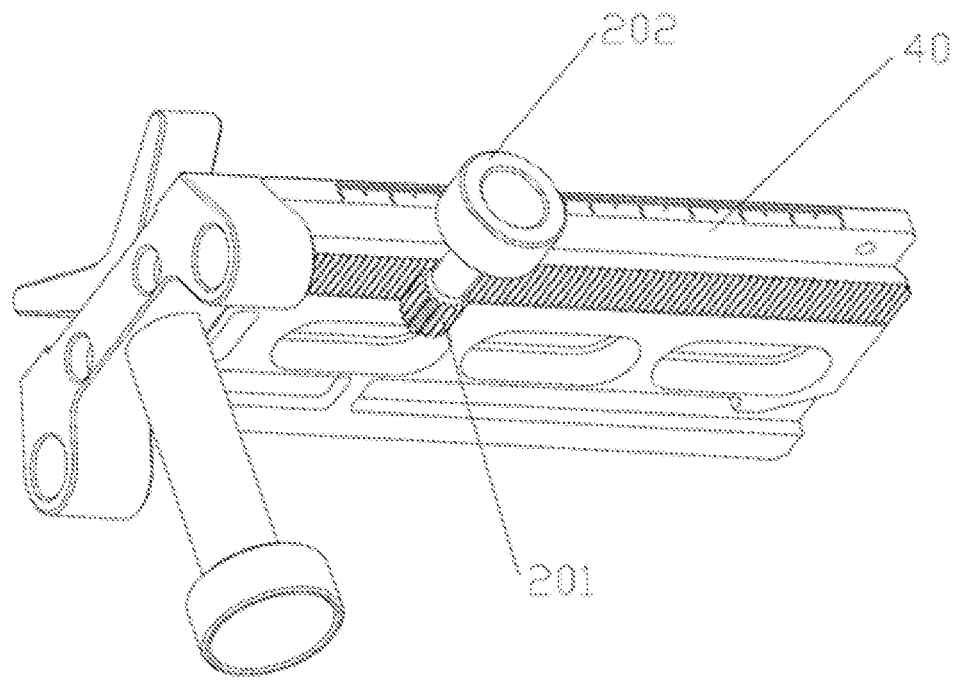
FIG. 6 is a schematic structural diagram of the interior of a Y axis direction centroid adjustment mechanism in a centroid adjustment mechanism of a pan-tilt-zoom camera according to Embodiment 1 of the present application.

As shown in FIG. 1 to FIG. 6, the present application provides a centroid adjustment mechanism of a pan-tilt-zoom camera. The centroid adjustment mechanism includes a camera base 40 provided on a pan-tilt-zoom, a slide platform 50 located below the camera base 40, a unit scale bar is engraved on a lateral side of the camera base 40, and a scale bar aligned with the unit scale bar of the camera base 40 is engraved on the slide platform 50. The centroid adjustment mechanism further includes: an X axis direction centroid adjustment mechanism 10, a Y axis direction centroid adjustment mechanism 20, and a Z axis direction centroid adjustment mechanism 30 that adjust a camera centroid in three directions in a working manner of meshing a gear with a rack.

The X axis direction centroid adjustment mechanism 10 is located at the bottom of the camera base 40, including: an X axis direction guide rod 101, an X axis direction gear 102, and an X axis direction knob 103, where an upper end of the X axis direction gear 102 and the slide platform 50 are fixedly connected, a lower end of the X axis direction gear and the X axis direction knob 103 are fixedly connected and are preferably glued, the X axis direction gear 102 meshes with an evenly distributed rack that is on an inner side of the X axis direction guide rod 101, and a unit scale bar is engraved on an outer side of the X axis direction guide rod 101.

the Y axis direction centroid adjustment mechanism 20 is located on a lateral side of the camera base 40, and includes: a Y axis direction gear 201 and a Y axis direction knob 202, where the Y axis direction gear 201 and the Y axis direction knob 202 are fixedly connected and are sleeved inside the slide platform 50, and are preferably glued, and the Y axis direction gear 201 meshes with an evenly distributed rack that is at the bottom of the camera base 40.

There are at least two Z axis direction centroid adjustment mechanisms, respectively located on two sides of the X axis direction guide rod 101, and including: a Z axis direction guide rod 301, a Z axis direction gear 302, a Z axis direction knob 303, a support block 60, and a fixed block 70, where an upper end of the support block 60 is connected to the slide platform 50, a lower end of the support block is sleeved on the X axis direction guide rod 101, the X axis direction guide rod 101 is sleeved on the Z axis direction guide rod 301 by using the fixed block 70, the Z axis direction gear 302 and the Z axis direction knob 303 are fixedly connected and are inserted to the fixed block 70, and are preferably glued, the Z axis direction gear 302 meshes with an evenly distributed rack that is on an inner side of the Z axis direction guide rod 301, and a unit scale bar is engraved on an outer side of the Z axis direction guide rod 301.

The following uses specific embodiments to further describe how the centroid adjustment mechanism of the pan-tilt-zoom camera in the present application adjusts a camera centroid. The centroid adjustment mechanism of the pan-tilt-zoom may perform adjustment according to photographing centroid requirements of different cameras in three directions of the X axis direction, the Y axis direction, and the Z axis direction. When the camera needs to be adjusted to the left or the right, because the lower end of the X axis direction gear 102 and the X axis direction knob 103 are fixedly connected, the X axis direction gear 102 is driven to move by rotating the X axis direction knob 103. Because the X axis direction gear 102 meshes with the rack on the inner side of the X axis direction guide rod 101, the X axis direction gear 102 is driven to move along the X axis direction guide rod 101. Because the upper end of the X axis direction gear 102 and the slide platform 50 are fixedly connected, movement of the X axis direction gear 102 drives the slide platform 50 to move. Besides, because the slide platform 50 is located below the camera base 40 and is connected to the camera base 40 by using the locating groove, movement of the slide platform 50 drives the camera base 40 to move. As the X axis direction knob 103 is rotated, the camera base 40 is eventually driven to move to the left or the right along the X axis direction guide rod 101. When the camera needs to be adjusted to the front or the back, the Y axis direction knob 202 is rotated. Because the Y axis direction gear 201 and the Y axis direction knob 202 are fixedly connected, rotation of the Y axis direction knob 202 drives the Y axis direction gear 201 to move. Because the Y axis direction gear 201 meshes with the rack that is at the bottom of the camera base 40, the camera base 40 is driven to move. Therefore, rotation of the Y axis direction knob 202 eventually drives the camera base 40 to move to the front or the back. Meanwhile, the Y axis direction knob 202 is sleeved inside the slide platform 50, and the scale bar aligned with the unit scale bar of the camera base 40 is engraved on the slide platform 50. This design enables the centroid adjustment mechanism to have a compact structure and aesthetic appeal, it is convenient to observe and adjust a distance change, an adjustment degree can be controlled more easily, and quick and accurate adjustment is made. When the camera needs to be adjusted upwards or downwards, the Z axis direction knob 303 is rotated. Because the Z axis direction gear 302 and the Z axis direction knob 303 are fixedly connected, rotation of the Z axis direction knob 303 drives the Z axis direction gear 302 to move. Because the Z axis direction gear 302 meshes with the rack that is on the inner side of the Z axis direction guide rod 301, the Z axis direction gear 302 is driven to move along the Z axis direction guide rod 301. Because the Z axis direction gear 302 is inserted to the fixed block 70, movement of the Z axis direction gear 302 drives the fixed block 70 to move. Because the X axis direction guide rod 101 is sleeved on the Z axis direction guide rod 301 by using the fixed block 70, movement of the fixed block 70 drives the X axis direction guide rod 101 to move. Besides, because the upper end of the support block 60 is connected to the slide platform 50, and the lower end of the support block 60 is sleeved on the X axis direction guide rod 101, movement of the X axis direction guide rod 101 drives the support block 60 to move and therefore drives the slide platform 50 to move. In addition, because the slide platform 50 is located below the camera base 40 and is connected to the camera base 40 by using the locating groove, movement of the slide platform 50 drives the camera base 40 to move, rotation of the Z axis direction knob 303 eventually drives the camera base 40 to move upwards or downwards along the Z axis direction guide rod 301. Meanwhile, the rack on the centroid adjustment mechanism of the pan-tilt-zoom is evenly distributed, and quick and even adjustment can be made in the three directions. Adjustment can be made in the three directions, or adjustment can be made in only one or two directions according to an actual case.

The present application provides a centroid adjustment mechanism of a pan-tilt-zoom camera. The centroid adjustment mechanism of the pan-tilt-zoom camera can respectively perform adjustment for different cameras in three directions of an X axis direction, a Y axis direction, and a Z axis direction, and rotate knobs in the three directions to drive a gear to mesh with a rack in the three directions, so that adjustment is quick and accurate.

Embodiment 2

The present application provides a pan-tilt-zoom, including a pan-tilt-zoom body and the centroid adjustment mechanism of the pan-tilt-zoom camera provided in Embodiment 1 of the present application. For a specific structure of the centroid adjustment mechanism, refer to descriptions in Embodiment 1, and details are not described herein again.

The present application provides a pan-tilt-zoom, including a pan-tilt-zoom body and the centroid adjustment mechanism of the pan-tilt-zoom camera provided in Embodiment 1 of the present application. The centroid adjustment mechanism of the pan-tilt-zoom camera can respectively perform adjustment for different cameras in three directions of an X axis direction, a Y axis direction, and a Z axis direction, and rotate knobs in the three directions to drive a gear to mesh with a rack in the three directions, so that adjustment is quick and accurate. In addition, the rack and a scale are both provided on a pan-tilt-zoom guide rod and a camera base, so that the pan-tilt-zoom has a compact structure and aesthetic appeal of external appearance while quickly adjusting a camera centroid.

Embodiment 3

The present application further provides an aerial vehicle (not shown in the figure), including an aerial vehicle body, a camera, and the pan-tilt-zoom provided in Embodiment 2 of the present application. For a specific structure of the pan-tilt-zoom, refer to descriptions in Embodiment 1 and Embodiment 2, and details are not described herein again.

The present application provides an aerial vehicle, including an aerial vehicle body, a camera, and the pan-tilt-zoom provided in Embodiment 2 of the present application. The pan-tilt-zoom includes a centroid adjustment mechanism of the pan-tilt-zoom camera. The centroid adjustment mechanism can respectively perform adjustment for different cameras in three directions of an X axis direction, a Y axis direction, and a Z axis direction, and rotate knobs in the three directions to drive a gear to mesh with a rack in the three directions, so that adjustment is quick and accurate. Besides, the aerial vehicle having the pan-tilt-zoom has high aerial photographing quality, and can quickly and precisely adjust a camera centroid position required by photographing.

The foregoing descriptions are merely preferred embodiments of the present application, but are not intended to limit the present application. Any modification, equivalent replacement, or improvement made without departing from the spirit and principle of the present application should fall within the protection scope of the present application.

What is claimed is:

1. A centroid adjustment mechanism of a pan-tilt-zoom camera, comprising:
   a camera base;
   a slide platform located below the camera base;
   an X axis direction centroid adjustment mechanism for driving the camera base to move along a X direction;
   a Y axis direction centroid adjustment mechanism for driving the camera base to move along a Y direction; and
   a Z axis direction centroid adjustment mechanism for driving the camera base to move along a Z direction;
   the X axis direction centroid adjustment mechanism, the Y axis direction centroid adjustment mechanism and the Z axis direction centroid adjustment mechanism adjust a camera centroid in the X direction, Y direction and Z direction respectively, in a working manner of meshing a gear with a rack.

2. The centroid adjustment mechanism of the pan-tilt-zoom camera according to claim 1, wherein the X axis direction centroid adjustment mechanism is located at the bottom of the camera base, comprising: an X axis direction guide rod, an X axis direction gear, and an X axis direction knob, wherein an upper end of the X axis direction gear and the slide platform are fixedly connected, a lower end of the X axis direction gear and the X axis direction knob are fixedly connected, and the X axis direction gear meshes with a rack that is on an inner side of the X axis direction guide rod;

the Y axis direction centroid adjustment mechanism is located on a lateral side of the camera base, and comprises: a Y axis direction gear and a Y axis direction knob, wherein the Y axis direction gear and the Y axis direction knob are fixedly connected and are sleeved inside the slide platform, and the Y axis direction gear meshes with a rack that is at the bottom of the camera base; and the Z axis direction centroid adjustment mechanism is located on two sides of the X axis direction guide rod, and comprises: a Z axis direction guide rod, a Z axis direction gear, a Z axis direction knob, a support block, and a fixed block, wherein an upper end of the support block is connected to the slide platform, a lower end of the support block is sleeved on the X axis direction guide rod, the X axis direction guide rod is sleeved on the Z axis direction guide rod by using the fixed block, the Z axis direction gear and the Z axis direction knob are fixedly connected and are inserted to the fixed block, and the Z axis direction gear meshes with a rack that is on an inner side of the Z axis direction guide rod.

3. The centroid adjustment mechanism of the pan-tilt-zoom camera according to claim 1, wherein a unit scale bar is engraved on a lateral side of the camera base, and a scale bar aligned with the unit scale bar of the camera base is engraved on the slide platform.

4. The centroid adjustment mechanism of the pan-tilt-zoom camera according to claim 2, wherein unit scale bars are respectively engraved on outer sides of the X axis direction guide rod and the Z axis direction guide rod.

5. The centroid adjustment mechanism of the pan-tilt-zoom camera according to claim 1, wherein there are at least two Z axis direction centroid adjustment mechanisms.

6. A pan-tilt-zoom, comprising: a pan-tilt-zoom body and a centroid adjustment mechanism of a pan-tilt-zoom camera, wherein the adjustment mechanism comprises:

a camera base;

a slide platform located below the camera base;

an X axis direction centroid adjustment mechanism for driving the camera base to move along a X direction;

a Y axis direction centroid adjustment mechanism for driving the camera base to move along a Y direction; and a Z axis direction centroid adjustment mechanism for driving the camera base to move along a Z direction;

the X axis direction centroid adjustment mechanism, the Y axis direction centroid adjustment mechanism and the Z axis direction centroid adjustment mechanism adjust a camera centroid in the X direction, Y direction and Z direction respectively, in a working manner of meshing a gear with a rack.

7. The pan-tilt-zoom according to claim 6, wherein the X axis direction centroid adjustment mechanism is located at the bottom of the camera base, comprising: an X axis direction guide rod, an X axis direction gear, and an X axis direction knob, wherein an upper end of the X axis direction gear and the slide platform are fixedly connected, a lower end of the X axis direction gear and the X axis direction knob are fixedly connected, and the X axis direction gear meshes with a rack that is on an inner side of the X axis direction guide rod;

the Y axis direction centroid adjustment mechanism is located on a lateral side of the camera base, and comprises: a Y axis direction gear and a Y axis direction knob, wherein the Y axis direction gear and the Y axis direction knob are fixedly connected and are sleeved inside the slide platform, and the Y axis direction gear meshes with a rack that is at the bottom of the camera base; and the Z axis direction centroid adjustment mechanism is located on two sides of the X axis direction guide rod, and comprises: a Z axis direction guide rod, a Z axis direction gear, a Z axis direction knob, a support block, and a fixed block, wherein an upper end of the support block is connected to the slide platform, a lower end of the support block is sleeved on the X axis direction guide rod, the X axis direction guide rod is sleeved on the Z axis direction guide rod by using the fixed block, the Z axis direction gear and the Z axis direction knob are fixedly connected and are inserted to the fixed block, and the Z axis direction gear meshes with a rack that is on an inner side of the Z axis direction guide rod.

8. The pan-tilt-zoom according to claim 6, wherein a unit scale bar is engraved on a lateral side of the camera base, and a scale bar aligned with the unit scale bar of the camera base is engraved on the slide platform.

9. The pan-tilt-zoom according to claim 7, wherein unit scale bars are respectively engraved on outer sides of the X axis direction guide rod and the Z axis direction guide rod.

10. An aerial vehicle, comprising: an aerial vehicle body, a camera, and the pan-tilt-zoom according to claim 6.

* * * * *